2,892,798

IRREVERSIBLE TEMPERATURE CHANGE COLOR INDICATOR

David L. Dobbs, Mariemont, Robert F. Gill, Jr., Cincinnati, and Ronald B. Howes, Mariemont, Ohio, assignors to Research Laboratories, Inc., Newtown, Ohio, a corporation of Ohio No Drawing. Application December 20, 1956
Serial No. 629,462

12 Claims. (Cl. 252—408)

This invention relates to temperature history indicators, and more particularly to a color indicator effective in the vicinity of the freezing point of water to show, for example, whether a product has been frozen and subsequently thawed or warmed from a relatively cold temperature to a relatively warmer temperature which might for example, damage the product.

With the advent of the general use of freezing as a means for preserving foods have come the attendant problems of maintaining the conditions essential to the preservation of quality and prevention of spoilage of the frozen food. Selection and preparation of raw fruits, vegetables, meats, and other foods and the packaging and freezing of produce in preparation for the market are generally processing steps which are under the supervision and control of the frozen food manufacturer. The producer of such products is in a position to see to it that these steps are properly done so that the product which it finally ships from its processing plants and into the channels of trade bearing its trademark as a guarantee of quality, meets its standards of quality.

From this point until the food is finally consumed, it is entrusted to the care of carrier, wholesaler, retailer, consumer and frequently other agencies. Being a perishable product which is highly sensitive to the conditions under which it is kept, its quality at the time of consumption may be adversely affected by improper care at any moment as it progresses through distribution channels. Certain drugs and some other products such as cut flowers also must be maintained at relatively carefully controlled temperatures during their passage through distribution channels and the invention is applicable to such products as well as to food.

With frozen foods, one hazard that must be most carefully guarded against is the premature thawing of the frozen product. Once thawed, the foodstuff rapidly deteriorates and, even if refrozen immediately, the quality is irreparably damaged. Under the circumstances, it is important to both consumer and producer that means be provided to indicate the fact that a frozen product has been thawed, the indication remaining unchanged by subsequent refreezing. Other products such as certain drugs or biological preparations may be shipped in either frozen or unfrozen condition and may be damaged by a temperature increase which does not cause a change of state, i.e., which does not necessarily cause thawing. With such products, it is important to provide indicating means which show whether such temperature increase has occurred.

An object of the present invention is to provide a composition having initially a definite and recognizable hue or absence of hue at temperatures above about 0° C., which when cooled below a temperature in the range of about −16° C. to 0° C. changes color in a clear and distinctive manner, which then again changes color in a clear and distinctive manner upon elevation of its temperature above a temperature in the same range, and which retains the latter color upon subsequent depression of its temperature below 0° C.

A further object is to provide a composition which exhibits such distinctive color change as a function of temperature after being stored for long periods of time at normal room temperatures.

Further objects will become apparent from the following detailed description in which it is our invention to illustrate the applicability of the invention without limiting its scope to less than that of all those equivalents which will be apparent to one skilled in the art. The particular composition herein described is preferably initially clear and colorless; under the influence of freezing temperatures (a preselectable temperature in the range of about −16° C. to about 0° C.) it freezes to an ice which is tinted a bright yellow or rich chocolate hue; upon subsequent exposure to thawing temperatures (a preselectable temperature in the range of about −16° C. to about 0° C.) it assumes a red color, and retains this characteristic red color upon refreezing.

The indicator composition comprises a colloidal solution, that is a "sol," comprising solid particles or micelles of colloidal size which comprise mercuric and cuprous iodide (chemically or physically associated in a complex or double salt) colloidally dispersed in a liquid phase comprising the iodide of an alkali metal. Also preferably contained in the solution is free iodine which is believed to be absorbed in the colloidal micelles and a peptizing agent such as the sulfate of an alkali metal. There may also be added one or more additives to make each of the colors more clear and thus make the color change more easily recognizable. These additives serve as peptizing agents which affect the micelles in such a way as to prevent a re-peptization after the red color has formed, thus making the color change cycle irreversible. Preferred additives for this purpose are selected from the group: intermediate monohydric and dihydric saturated aliphatic alcohols, n-butyl alcohol and 1,4-butanediol being especially suitable. The composition may also include a substance of white or neutral color which acts as a brightener for each of the colors and, therefore, contributes to making the color change more distinct and which may also serve as a relatively inexpensive diluent and extender and may also have a stabilizing effect on the colloidal dispersion, colloidal silica being preferred.

Alternatively, the indicator composition may comprise a water slurry or aqueous suspension of mercuric iodide and cuprous iodide, both substantially insoluble in water, the liquid phase comprising a solution of the iodide of an alkali metal. Such a slurry or suspension is believed to consist of a colloidal solution, as above described, having solid particles of greater than colloidal size suspended therein in addition to the colloidal micelles. In this case the relative proportions of the several ingredients are not critical; if a very small quantity of one of the two salts is present a discernable color change is obtained even with one salt present at essentially trace level; however, it has been found experimentally that within certain ranges the color intensities are greater and, therefore, far more readily recognized and accordingly the preferred compositions are those which fall within such ranges. In this case the ratio of cuprous iodide and mercuric iodide in the slurry or suspension based upon parts by weight may range from about .08 to about 8.0, the color change being clearly observable throughout this range; a preferred ratio for maximum definition of color indication is about 2 parts by weight of cuprous iodide to 1 part by weight of mercuric iodide.

Silver and lead iodides, as well as soluble nickel iodide, do not give results comparable with those obtained with cuprous and mercuric iodide when used in place of either one or in combinations with one another.

In order to provide a composition which exhibits a suitably distinct color change, it is necessary that there be present free iodine to the extent of from about .35 to .65 gram per liter of sol or slurry, the use of from about .4 to about .5 gram per liter being preferred. In order to provide a suitable colloidal solution, such free iodine is associated with either the cuprous iodide or with the iodide of an alkali metal such as potassium iodide.

In order to provide a suitable sol it is desirable that a peptizing agent be present. The sulfate of an alkali metal has been found particularly suitable for this purpose; either sodium sulfate or potassium sulfate or mixtures of these two salts may be used. For purposes of convenience and simplicity it is preferred to use potassium sulfate.

Thus cuprous iodide for use in the composition may suitably have associated therewith about 1.6 milligrams of iodine per gram of cuprous iodide and 8.5 milligrams of potassium sulfate per gram of cuprous iodide. Satisfactory results may be obtained if all or a portion of the iodine and all or a portion of the peptizing agent be associated with the potassium iodide rather than with the cuprous iodide.

The free iodine may be caused to associate with cuprous iodide by steeping cuprous iodide in an organic solvent containing iodine, by exposure of solid dry cuprous iodide to iodine vapors or by grinding and heating cuprous iodide to cause partial thermal decomposition thereof. A preferred method, however, of introducing free iodine is to form the equilibrium complex of potassium iodide with iodine, this complex being found to facilitate the peptization of the cuprous iodide and mercuric iodide upon introduction thereof into a suitable amount of water. Thus the introduction of a preferred amount of iodine as above set forth may be suitably accomplished in a relatively efficient manner by digesting together for a short time the necessary quantities of cuprous iodide, iodine and potassium iodide.

In preparing the composition it must be taken in account that commercial cuprous iodide invariably contains free iodine associated therewith, which may vary from a trace quantity to considerable amount. If commercial cuprous iodide is used in preparing the composition, at least a part of the free iodine necessary is therefore always furnished thereby. The use of procedure described in the previous paragraph is generally necessary because insufficient free iodine is contained in most commercial cuprous iodide.

As above mentioned, the addition of the sulfate of an alkali metal is preferred in order to facilitate peptization, that is, the formation of suitable colloidal micelles; this compound is preferably added in sufficient quantity to provide a final concentration thereof in the colloidal solution of about .005 molar although peptization is facilitated with both lesser and greater concentrations so that a usable concentration is from about .001 molar to about 1.1 molar.

Since both cuprous iodide and mercuric iodide are present in the colloidal solution in peptized form, that is, as solids associated in the colloidal micelles, the addition of each of these salts in quantities greater than the minimum necessary to provide such quantities of these salts in the micelles, serves primarily to facilitate their peptization and the formation of a suitable colloid in a minimum of time. A suitable colloid may be made by filtering or centrifuging the precipitate from a slurry or aqueous suspension as set forth above, wherein the ratio between the cuprous iodide and mercuric iodide in the slurry is from about .08 to about 8. In preparing such a slurry, there may be used as much as 375 grams per liter of cuprous and mercuric iodide, these two salts being present in a ratio of from .08 to 8 as above set forth. However, with a preferred ratio of two parts of cuprous iodide to one part of mercuric iodide, excellent results are obtained with 30 grams per liter of cuprous iodide and 15 grams per liter of mercuric iodide or a total of 45 grams per liter of the two salts and in the interest of economy and efficiency this lower amount is preferred. There may be used with equally suitable results an even much smaller quantity of cuprous iodide and mercuric iodide, such total quantity of the two salts being as low as 15 grams per liter, it being only necessary that sufficient of each of these salts be provided to provide material adequate to be peptized to form the micelles containing the salts.

Certain materials may be added to produce the advantageous effect of providing a yellowish color rather than a chocolate color upon being frozen, a clear red color being exhibited upon subsequent thawing and upon refreezing after such thawing. Compounds particularly suitable for this purpose include n-propyl alcohol, n-propyl acetate, isopropyl alcohol, isopropyl acetate, secondary, tertiary and normal butyl alcohols, isobutyl alcohol, normal amyl alcohol, isoamyl alcohol, normal hexyl and heptyl alcohols, 1-octanol, 2-octanol, dimethyl methyl ethyl, and diethyl ketones, and isoamyl, n-butyl and isobutyl acetates. Thus, generally saturated aliphatic monohydric and dihydric alcohols, and saturated aliphatic acetates containing from 3 to 8 carbon atoms are useful for this purpose. N-butyl alcohol and 1,4-butanediol were found most effective. These compounds most markedly affect the zeta-potential of interfaces negatively charged against water. Concentrations of from .3% to 3% of normal butyl alcohol provide favorable results in a colloidal solution prepared as set forth above and such a solution containing 1% n-butyl alcohol was found to freeze yellow and remain so even at temperatures as low as $-13°$ C. and to change sharply to red when warmed to about $-4°$ C., a voluminous red precipitate being formed which does not re-dissolve for extended periods at room temperature. The concentration of n-butyl alcohol may be varied to control the temperature at which color change takes place. Lower concentrations provide color change at somewhat lower temperatures, as low as about $-16°$ C. for example, while higher concentrations such as 3% cause the color change to take place at about $0°$ C., the change, however, being somewhat less sharply defined. The addition of about 1% of 1,4-butanediol in place of n-butyl alcohol causes a sharp color change to occur between about $-10°$ and $-12°$ C.

Inert additive may be employed to produce a product in a form most convenient for use in a particular application. Finely divided, purified white diatomaceous earths are to some extent useful for this purpose; however, preferred results are obtained with colloidal silica. Desirable improvements in the brightness of the color obtained both upon freezing and after subsequent thawing are realized if colloidal silica, either in the form of colloidal silica powder or in the more usual form of a silica sol is added to a solution prepared as previously set forth. However, much improved results are obtained if the acidity of the silica sol is adjusted by the addition of acids to provide a pH in the usual range of the indicator solution, that is, from 3 to 5 and, preferably, about 4.5. The formation of a gel if the resulting mixture is allowed to stand at room temperature normally requires several days, but the gel may be caused to form more rapidly by either freezing or heating the mixture. Thus a mixture if prepared in accordance, for example, with Example 4 or 5 below, might have added thereto from one part to one hundred parts of acidified silica sol to one hundred parts of solution, satisfactory results having been obtained at each of these concentrations and several intermediate concentrations. A suitable gel may also be provided by acidifying a sodium silicate solution to pH 4.5 and mixing the resultant acidified solution with the indicating solution prepared as previously mentioned, for example, as in Examples 1 through 3, below. Generally, the use of a previously prepared solution of colloidal silica is preferable since acidification of sodium silicate solution produces a certain amount of sodium chloride which, to some extent, inhibits the formation of suitably bright colors. A suitable colloidal silica may be provided in accordance with Patent 2,574,902 or in accordance with Patent 2,601,352.

Freezing or heating to accelerate the initiation of gel formation may suitably be carried out after the mixture of colloidal indicator solution and colloidal silica sol has been packaged or encapsulated as set forth above.

In order to obtain satisfactory color change and stability or shelf-life over an extended period of time it is desirable that contamination of the colloidal solution be avoided.

The following examples indicate specific procedures for preparing satisfactory indicator compositions in accordance with the invention:

*Example 1*

Two grams of ground cuprous iodide were allowed to digest for two hours with 1.0 milliliter of $\frac{1}{10}$ molar potassium iodide containing 8 milligrams of iodine per milliliter and .85 milliliter of $\frac{1}{10}$ molar potassium sulfate. Then one gram of mercuric iodide powder and 15 milliliters of demineralized water were added and the mixture allowed to stand with occasional shaking for about three hours during which time a yellow tint, which had been originally present, disappeared. The resulting slurry was then filtered by gravity through a retentive acid-washed filter paper (Whatman No. 50) and the resulting clear colloidal solution was ready for use. Its pH was about 4.5 and no iodine reaction could be elicited with starch. Various batches prepared according to this procedure exhibited pH's of from 3 to 5 and total solid contents, determined by evaporation, of about 4.85 milligrams per milliliter. The solution had a specific gravity of about 1.002.

*Example 2*

A stock iodine-iodide solution was prepared containing a concentration of 10 milligrams of iodine per milliliter of .1 normal potassium sulfate solution by grinding 2.5 grams of iodine crystals with 25 milliliters of 1 normal potassium iodide solution in a mortar and then diluting to 250 milliliters. 34 grams of ground cuprous iodide and 17 grams of mercuric iodine powder were then added at room temperature to 57.4 milliliters of $\frac{1}{10}$ molar potassium sulfate and 46.4 milliliters of the previously prepared stock solution and 19.9 milliliters of $\frac{1}{10}$ molar potassium iodide solution, and the resulting suspension was allowed to stand with occasional shaking for one hour. One liter of demineralized water was then added and the suspension shaken occasionally for about three to four hours or more or until all yellow tinge which had been previously present had disappeared. The resulting slurry could be used without additional treatment but preferably was either centrifuged or filtered to provide a clear, almost colorless filtrate having pH of from 3 to 5. For example, in one particular batch a pH of 4.9 was observed.

*Example 3*

Potassium iodide, potassium sulfate and iodine are added to a quantity of water sufficient to provide a concentration of .05 molar potassium sulfate, .06 molar potassium iodide and 5 grams per liter of iodine, and allowed to stand at room temperature from one to ten hours with occasional shaking. Sufficient cuprous iodide and mercuric iodide are then added at any suitable subsequent time in quantities sufficient to provide about 30 grams per liter of cuprous iodide and 15 grams per liter of mercuric iodide in the final solution although lesser quantities may be used sufficient to provide as little as 15 grams per liter to 25 grams per liter of these two salts together in the final solution and after being allowed to stand for from about 30 minutes to 2 hours at room temperature, sufficient water is added to reduce the concentration of potassium sulphate, potassium iodide and iodine to $\frac{1}{10}$th that of the concentration of these materials originally present and decrease the concentration of cuprous iodide and mercuric iodide to the aforementioned values. The resulting slurry or suspension is then treated as by filtering or centrifuging to remove the precipitate present and provide a suitable sol or colloidal solution according to the invention.

*Example 4*

To 990 milliliters of the colloidal solution prepared in accordance with Example 1 there is added 10 milliliters of reagent grade n-butyl alcohol slowly and with constant stirring. The mixture is allowed to stand overnight and is then filtered by suction to free it from a small amount of resultant red precipitate, thereby providing an improved indicator solution which exhibits somewhat sharper color change from red to yellow upon freezing, with subsequent irreversible clear color change to red when later thawed.

*Example 5*

To 985 milliliters of colloidal indicator solution prepared in accordance with Example 2, there is added 15 milliliters of reagent grade 1,4-butanediol, the mixture being stirred thoroughly during the addition. The mixture is allowed to stand overnight and then filtered to remove any precipitate which may be formed and thereby provide an improved indicator solution which changes color at about $-10$ to $-12°$ C. as previously mentioned.

*Example 6*

70 milliliters of colloidal solution prepared in accordance with Example 4 is mixed with 30 milliliters of a colloidal silica solution having a concentration of about 60% solids, the pH of which has been first adjusted to 4.5 by any suitable means such as with hydrochloric acid. When frozen and subsequently thawed, the color change and sharpness of color after thawing were both considerably improved.

*Example 7*

The mixture prepared according to Example 6 was allowed to stand at room temperature for about two weeks until gelation occurred. The resulting gel exhibited the sharp color change upon freezing and sharp irreversible color change upon subsequent thawing hereintofore referred to and only slight break-down occurred when frozen or thawed, the extent of break-down being so small that its suspending properties were only slightly reduced and its usefulness was not substantially impaired.

Generally colloidal solutions prepared in accordance with Examples 1 to 5 contain micellar solids in the amount of from 4.4 to 5.5% by weight thereof.

The product so obtained may be sealed or encapsulated in an envelope of a suitable transparent film material such as, for example, polyethylene, to provide a finished product in the form of a thin, flat capsule which may be cemented to the package, as a package of frozen food, whose thermal history is to be indicated.

The normal acidity of filtrates (pH 3 to 5) was not found to change significantly nor was any free iodine liberated or precipitate formed due to ageing in closed containers during the period of time they were observed (2 years). Small variations of about ½ pH unit were common, with a tendency for stoppered samples to become slightly more acid and samples exposed to atmospheric carbon dioxide slightly less acid. The acidity of formulations according to Example 4 was generally found to be very slightly higher (about ½ pH unit less) than that of the filtrate from which they were prepared, e.g., solutions according to Examples 1 and 2. No significant differences in the ageing of filtrates with and without n-butanol were noted. Shaking and agitation of bottles being transported was not found to be deleterious.

Samples of sol were heated to 99° C. for 20 minutes with no significant alteration. A very slight yellow discoloration of the liquid was noted, but tests for iodine remained negative. The freezing behavior was unchanged.

In the interest of complete disclosure of the invention, and without in any way limiting its proper scope as defined by the claims appended hereto, the probable mechanism by which the color indicating system functions may be outlined on a more or less speculative basis as follows: The two relatively insoluble iodides, the copper in its monovalent and the mercury in its divalent form, tend to form one or more colloidal micellar complexes when mixed in a water suspension, leaving a major bulk of unreacted material which may be removed by filtration or centrifugation. The soluble iodide, however, appears to enter into the reaction so that on freezing, monomolecular iodine is liberated or "squeezed" from the micelles, due to contraction thereof. Its tint masks the red color so that it appears to the eye that all of the solid has been converted to the yellow or chocolate color. This thin film is retained only at low temperatures and above a predetermined critical point it is released into the aqueous phase of the system, and becomes ordinary molecularly-associated iodine, which is very faintly yellow-colored like common tincture of iodine when it has been very greatly diluted. With the film thus eliminated, the red color of the micelles again becomes strongly visible.

The indicator material, in concentration about 5 grams of solids per liter, distinctly shows the properties of a colloid rather than those of a solution. Experimentally, the Tyndall effect, general adherence to the Schultz-Hardy rule, and electrophoretic evidence have all been demonstrated. Its behavior on freezing is typical of a colloid system, as are the effects produced by additives known to alter the zeta-potential.

A negative micellar charge, to be expected on theoretical grounds, was demonstrated by the repellent effect of cellulose-water interfaces. It was also shown by electrophoresis through a cellophane membrane. The micelles appear to be extremely small, approaching ionic size, since there was noticeably less passage of fluoresceinate ion through the membrane in the same length of time.

The micelle is presumed to be constructed of cuprous and mercuric iodide complex containing relatively large amounts of absorbed iodine. The surface of the complex particle is assumed to be positively charged due to ionization and loss of iodide ions, while a surrounding cloud of sulfate, iodide and tri-iodide ions completes the micelle.

Molecules of n-butanol are presumed to orient themselves in the double layer with the aliphatic ends absorbed on the surface of the metallic iodide complex and their hydroxyl groups in the negative moiety. This stabilizes the system in certain respects, preventing premature agglutination. The separation of ice crystals concentrates the colloid to some extent, and the energy removed from the system is supplied by a decrease in surface area with resultant increase in particle size. Thus a certain quantity of colloid is precipitated as visible particles which are not readily redispersed. The liberation of iodine is undoubtedly associated with and probably proportional to the reduction in surface area of the colloid on freezing.

A critical aspect of the phenomena, essential for the purposes of the invention, is that once the iodine has become molecularly associated, as described under the influence of temperature elevation, it will not again dissociate to reform the masking film when the mixture is refrozen. Even though there may be an excess of the soluble iodide present, the film does not form as in the initial refrigeration. Apparently, when the associated iodine is present, the liberated iodine merely associates instead of forming a film.

Invention is claimed as follows:

1. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, an iodide of an alkali metal having a concentration of from 0.002 N to 0.08 N, and a sulfate of an alkali metal having a concentration of from .001 M to 1.1 M.

2. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, an iodide of an alkali metal having a concentration of from 0.002 N to 0.08 N, a sulfate of an alkali metal having a concentration of from .001 M to 1.1 M and a substance selected from the group consisting of saturated aliphatic monohydric and dihydric alcohols, saturated ketones containing 3 to 5 carbon atoms and saturated aliphatic acetates containing 3 to 8 carbon atoms.

3. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, an iodide of an alkali metal having a concentration of from 0.002 N to 0.08 N, a sulfate of an alkali metal having a concentration of from .001 M to 1.1 M and n-butyl alcohol.

4. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, an iodide of an alkali metal having a concentration of from 0.002 N to 0.08 N, a sulfate of an alkali metal having a concentration of from .001 M to 1.1 M and 1,4-butanediol.

5. The composition of claim 2 adsorbed on the surface of a carrier material consisting essentially of colloidal silica.

6. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, potassium iodide having a concentration of from 0.001 N to 0.08 N, and potassium sulfate having a concentration of from .001 M to 1.1 M.

7. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, potassium iodide having a concentration of from 0.002 N to 0.08 N, potassium sulfate having a concentration of from .001 M to 1.1 M, and n-butyl alcohol.

8. A thermally responsive indicator composition which comprises a colloidal solution comprising cuprous iodide and mercuric iodide in a ratio of from .08 to 8 and total concentration of from 15 to 375 grams per liter, free iodine in an amount from about .35 to .65 gram per liter of colloidal solution, potassium iodide having a concentration of from 0.002 N to 0.08 N, potassium sulfate having a concentration of from .001 M to 1.1 M, and 1,4-butanediol.

9. A thermally responsive indicator composition comprising a colloidal solution wherein the micelles in said solution comprise cuprous iodide and mercuric iodide in a ratio of from .08 to 8 and total concentration of from 15 to 375 grams per liter and free iodine in an amount from about .35 to .65 gram per liter of colloidal solution and the liquid phase of said solution comprises potassium iodide having a concentration of from 0.002 N to 0.08 N and potassium sulfate having a concentration of from .001 M to 1.1 M dissolved in water, the micellar solids in said solution constituting from 4.4 to 5.5% by weight thereof.

10. A thermally responsive indicator composition comprising a slurry of particles of larger than colloidal size suspended in a sol, said slurry comprising cuprous iodide and mercuric iodide in a ratio of from .08 to 8 and total concentration of from 15 to 375 grams per liter, potassium iodide having a concentration of from 0.002 N to 0.08 N, free iodine associated with at least one of said iodides and having a concentration of from 0.35 to 0.65 gram per liter, and the sulfate of an alkali metal having a concentration of from .001 M to 1.1 M, said slurry being adapted to have said suspended particles filtered therefrom to provide a thermally responsive indicator sol.

11. The composition of claim 10 further characterized by containing from 0.3% to 3% n-butyl alcohol.

12. The composition of claim 11 further characterized by said suspended particles being removed and admixture of 100 parts of the remaining sol with from 1 part to 100 parts of colloidal silica sol.

References Cited in the file of this patent

UNITED STATES PATENTS

| | | |
|---|---|---|
| 1,693,369 | Cochran | Nov. 27, 1928 |
| 2,553,369 | Hoffman | May 15, 1951 |